W. H. WHITE.
Scrubber and Condenser for Illuminating-Gas.

No. 165,141. Patented June 29, 1875.

Witnesses:

Inventor:
Wm. Henry White

UNITED STATES PATENT OFFICE

WILLIAM H. WHITE, OF BROOKLYN, NEW YORK, ASSIGNOR OF TWO-THIRDS HIS RIGHT TO CHARLES H. NEILSON AND HENRY M. MARTIN.

IMPROVEMENT IN SCRUBBERS AND CONDENSERS FOR ILLUMINATING-GAS.

Specification forming part of Letters Patent No. 165,141, dated June 29, 1875; application filed May 1, 1875.

*To all whom it may concern:*

Be it known that I, WM. HENRY WHITE, of city of Brooklyn, in the county of Kings and State of New York, have invented certain new and useful Improvements in Scrubber and Condenser for Illuminating-Gas; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of this invention is thoroughly to free illuminating-gas from tar and ammoniacal and aqueous vapors without impairing its illuminating power; and the invention consists in an apparatus which unites the properties of a scrubber, a purifier, and a condenser, which is compact in form, so that it occupies but little space, which can be manufactured at comparatively small cost, and which is constructed as follows, and as shown in the accompanying drawings, in which—

Figure 1:
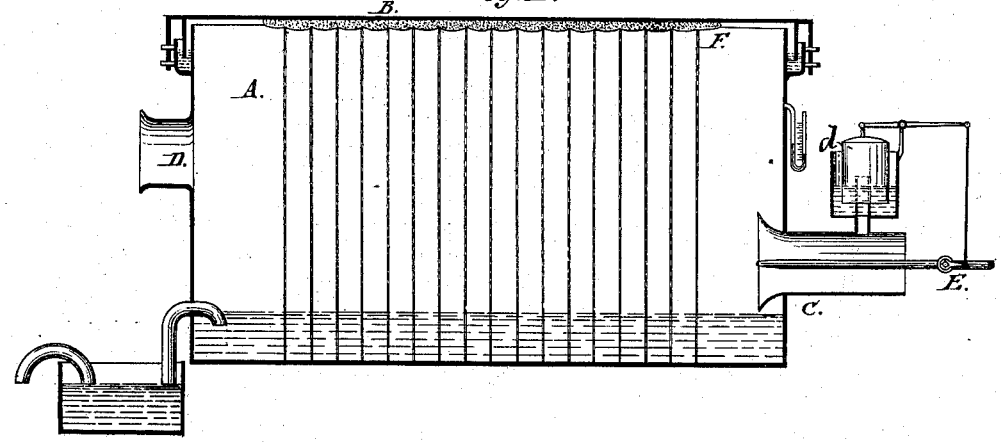
Figure 2:
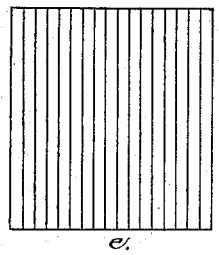
Figure 3:
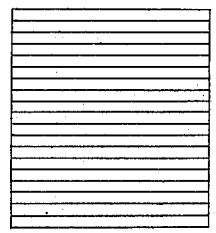
Figure 4:
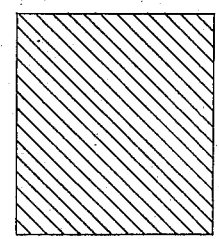
Figure 5:
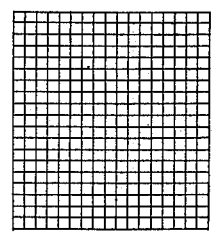
Figure 6:
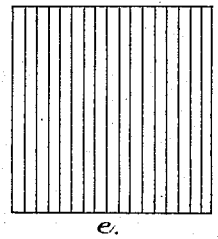
Figure 7:
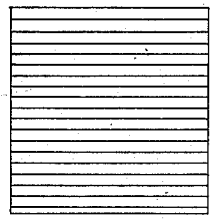
Figure 8:
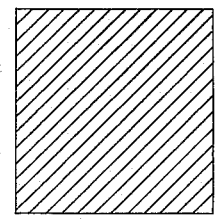
Figure 9:
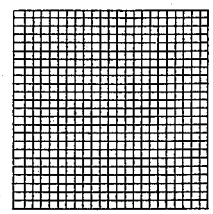
Figure 10:
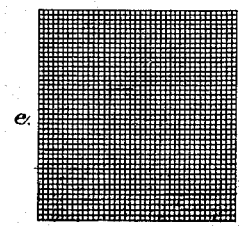

Figure 1 is a longitudinal section of the scrubber complete. Figs. 2, 3, 4, 5, 6, 7, 8, 9, and 10 are front views of some of the screens placed side by side, to show their various forms and the comparative size and shape of their perforations and interstices.

A suitable box or case, A, is made to contain a number of removable and adjustable screens, e. Boxes and screens are varied in size and number, according to the amount of gas which is daily to pass through the apparatus. By actual test I have found that I can advantageously pass about four hundred thousand cubic feet of gas through a scrubber of the kind shown in one day, thoroughly scrubbing it, the whole apparatus for this purpose being but three feet high by five feet wide and seven feet in length. I do not limit myself, however, to any particular size or shape. The box is provided with a removable top or cover, B, provided with suitable fastenings to keep it in position, and which has a downward-projecting rim or flange dipping into a liquid seal. This cover is made readily removable for access to the screens. Under the cover, and resting upon the upper edges of the screens, I provide a sheet of rubber or elastic composition, or a bag or bags of cotton, F, or their equivalents, the object of such provision being that the substance acts as an efficient packing to prevent the passage of gas through to the exit between the edges of the screens and the lid. At one end of the box is the inlet-pipe C for crude gas, and also a steam-inlet pipe, E. At the opposite side, but located higher, is the outlet-pipe D. All the pipes are provided with suitable valves. The screens are parallel within the box, and are from one and a half inch to three inches apart, and their distance apart may vary in the same apparatus. The first screen shall be at a distance from the inlet or front side greater than that between the screens, in order that the gas upon entering the box may expand before coming in contact with the first screen. The last screen is also some distance from the end of the box. The lower part of the box contains water, which becomes thicker as the tar and impurities run down from the screens, and the requisite height of the liquid is maintained by the waste-pipe $f$ dipping into a suitable seal. The screens $e$ have perforations and interstices of different size and shape, and are relatively so arranged that the perforations or openings in one screen oppose interstices or bars in the next, in consequence of which arrangement the gas passing through has but little direct or uninterrupted motion, is comminuted, and by constant interruption and contact deposits its impurities upon the screens. These soon become coated, and act thus powerfully to attract further impurities by reason of the affinity of like for like.

Notwithstanding the fact that the gas in its passage suffers the comminution and constant contact described, its illuminating properties will not be impaired, for, by reason of the friction of the gas with the screens, the temperature is not reduced to such a degree as to cause the light-giving elements to be deposited.

Whenever the apparatus becomes foul, and even during the passage of the gas, steam may be forced through from the pipe E. The condensed steam also assists the impurities to pass down the screens.

At any convenient place, but preferably in the front part of the box, I provide a pressure-gage, by means of which the back pressure of gas may be seen. On the gas-inlet pipe, and near to the scrubber, is a gas-holder float-gage, $d$, weighted to any designated pressure, and connected suitably with the valve in the steam-inlet pipe, so that as soon as the back pressure of the gas overcomes the fixed standard the holder will rise, open the steam-valve, and permit a blast of steam to enter, in regulated quantity and force, whenever the screens become too foul to permit the passage of the gas as freely as required. Upon the pressure being relieved the float sinks and the valve closes.

Having thus fully described my invention, what I claim as new, and desire to secure by Letters Patent, is—

1. The process of scrubbing, condensing, and purifying crude gas, which consists in passing it through a number of screens, having their orifices relatively arranged as described, said screens being placed vertically, so that the impurities shall collect upon the surfaces of the screens and present a moist and dripping surface to the passing gas, and attract further impurities until their accumulation causes them to trickle down, all substantially as described.

2. The process of preventing the deposit of the light-giving elements of illuminating-gas by condensation, which consists in scrubbing the crude gas by passing it through a number of screens in a closed case, the friction and pressure generating heat, substantially as described.

3. The process of cleaning the scrubber by passing steam through the same automatically when required.

4. The combined scrubber, condenser, and purifier, consisting of a box having inlet and outlet pipes for gas, and provided with vertical screens, as described.

5. The case A, packing F, and removable top B, sealed, as described.

6. The combination of the scrubber, the steam-pipe E, entering the scrubber, and provided with a suitable valve, and the gas-inlet pipe C, as and for the purpose described.

7. The combination of the pressure-gage on the scrubber with the valve in the steam-pipe described, for the purpose of automatically regulating the supply of steam, as set forth.

WM. HENRY WHITE.

Witnesses:
   A. B. McNILL,
   N. C. MILLER.